(12) United States Patent
Ohnishi et al.

(10) Patent No.: US 9,758,143 B2
(45) Date of Patent: Sep. 12, 2017

(54) VEHICLE BRAKE SYSTEM

(75) Inventors: Takaaki Ohnishi, Saitama (JP); Kunimichi Hatano, Saitama (JP); Kazuaki Murayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 536 days.

(21) Appl. No.: 13/988,179

(22) PCT Filed: Nov. 17, 2011

(86) PCT No.: PCT/JP2011/076567
§ 371 (c)(1),
(2), (4) Date: May 17, 2013

(87) PCT Pub. No.: WO2012/067198
PCT Pub. Date: May 24, 2012

(65) Prior Publication Data
US 2013/0232968 A1 Sep. 12, 2013

(30) Foreign Application Priority Data

Nov. 17, 2010 (JP) .................................. 2010-257366

(51) Int. Cl.
*B60T 13/74* (2006.01)
*B60T 8/36* (2006.01)
*B60T 8/40* (2006.01)

(52) U.S. Cl.
CPC .......... *B60T 13/745* (2013.01); *B60T 8/3685* (2013.01); *B60T 8/4081* (2013.01)

(58) Field of Classification Search
CPC ..... B60T 8/3685; E06C 7/083; F24D 19/0209
(Continued)

(56) References Cited

U.S. PATENT DOCUMENTS

| 2,209,477 A * | 7/1940 | Reibel ...................... H02K 5/24 |
| | | 248/606 |
| 4,586,590 A * | 5/1986 | Rishel .................. B60T 11/206 |
| | | 188/345 |

(Continued)

FOREIGN PATENT DOCUMENTS

CN 1436129 A 8/2003
JP 4-345529 A 12/1992
(Continued)

OTHER PUBLICATIONS

Kurt Ernst, Lost Cars of the 1980s—Buick GNX, Jan. 13, 2014, Hemmings Daily.*

(Continued)

*Primary Examiner* — Thomas E Lazo
*Assistant Examiner* — Dustin T Nguyen
(74) *Attorney, Agent, or Firm* — Carrier Blackman & Associates, P.C.; William D. Blackman; Joseph P. Carrier (57) ABSTRACT

There is provided a vehicle brake system to which an electric brake actuator constituting the vehicle brake system is stably attached and in which it is possible to dispose the electric brake actuator in a power plant storage chamber in a space-efficient manner. A vehicle brake system configured by disposing, on a vehicle, an input device to which the brake operation of an operator is inputted and a motor cylinder device for generating brake fluid pressure by driving a hydraulic pressure controlling piston stored in a cylindrical cylinder main body by means of an electric motor at least in accordance with the brake operation, wherein the motor cylinder device is attached in a manner such that at least a portion of the cylinder main body overlaps with a power plant in the vehicle up and down direction; and the electric motor is disposed below the cylinder main body.

7 Claims, 7 Drawing Sheets

(58) Field of Classification Search
USPC ...... 180/90.6, 312, 311, 244, 275, 276, 370, 180/325
See application file for complete search history.

(56) References Cited

U.S. PATENT DOCUMENTS

| | | | |
|---|---|---|---|
| 4,597,611 A | 7/1986 | Nishimura et al. | |
| 4,756,391 A | 7/1988 | Agarwal et al. | |
| 5,464,187 A * | 11/1995 | Linkner, Jr. | B60R 11/00 248/635 |
| 5,678,673 A | 10/1997 | Borschert et al. | |
| 5,988,767 A | 11/1999 | Inoue et al. | |
| 6,098,949 A * | 8/2000 | Robinson | B60T 8/3685 248/609 |
| 6,202,778 B1 * | 3/2001 | Mistry | B60R 19/00 180/69.1 |
| 6,357,835 B1 | 3/2002 | Boisseau | |
| 6,408,974 B1 * | 6/2002 | Viduya | B62D 21/00 180/312 |
| 6,574,959 B2 * | 6/2003 | Fulks | B60T 13/745 60/545 |
| 6,662,915 B2 * | 12/2003 | Bigsby | B60T 13/02 188/359 |
| 8,360,532 B2 | 1/2013 | Nishino et al. | |
| 8,555,634 B2 | 10/2013 | Ohno et al. | |
| 2003/0020327 A1 | 1/2003 | Isono et al. | |
| 2003/0038541 A1 | 2/2003 | Suzuki et al. | |
| 2005/0082134 A1 | 4/2005 | Bigi | |
| 2008/0079309 A1 * | 4/2008 | Hatano | B60T 8/4081 303/113.5 |
| 2010/0102622 A1 * | 4/2010 | Favaretto | B60K 6/48 303/152 |
| 2010/0126167 A1 | 5/2010 | Nagel et al. | |
| 2011/0285200 A1 | 11/2011 | Hatano et al. | |

FOREIGN PATENT DOCUMENTS

| | | |
|---|---|---|
| JP | 9-175376 A | 7/1997 |
| JP | 10-181557 A | 7/1998 |
| JP | 2007-084041 A | 4/2007 |
| JP | 2009-202867 A | 9/2009 |
| JP | 2010-023594 A | 2/2010 |

OTHER PUBLICATIONS

Office Action dated Sep. 29, 2014 by the Chinese Patent Office in regards to corresponding Chinese Patent Application No. 2014-092501228820.

Japanese Office Action dated Aug. 19, 2014, issued in the corresponding JP Patent Application 2012-544305.

Extended European search report dated Apr. 2, 2014 in the corresponding EP Patent Application 11842182.5.

* cited by examiner

VEHICLE BRAKE SYSTEM

TECHNICAL FIELD

The present invention relates to a vehicle brake system provided with an electric brake actuator for generating a hydraulic brake pressure by a rotational driving force of an electric motor when a braking operation section is operated.

BACKGROUND ART

Vehicle brake systems, which are provided with a servo unit for boosting the braking effort when a brake pedal is pedaled, are widely known. For example, Patent Document 1 discloses an electric brake actuator (electric servo unit) using an electric motor as a force boosting source.

The electric brake actuator disclosed by Patent Document 1 is configured as follows. A main piston is formed by a shaft member that moves forward and backward by an operation of a brake pedal, and a booster piston is formed by a cylindrical member outer fitted to the shaft member (main piston). The electric brake actuator is arranged such that a thrust force that is input from the brake pedal to the shaft member (main piston) and a thrust force applied by an electric motor to the cylindrical member (booster piston) generate a hydraulic brake pressure to boost the braking effort.

BACKGROUND ART DOCUMENT

Patent Document

Patent Document 1: JP2010-23594 A

DISCLOSURE OF THE INVENTION

Problems to be Solved by the Invention

Further, as the electric brake actuator disclosed by Patent Document 1 is an integrated type in which the electric motor is built in a cylinder main body (housing) housing the main piston and the booster piston, which makes the size of the cylinder main body large. Accordingly, in case of housing an electric brake actuator in a power plant hosing room for housing a power plant, there is a problem that an appropriate disposition for improving the space efficiency is difficult.

In this situation, although a structure in which an electric motor is disposed outside a cylinder main body can be discussed, as the electric motor is heavy, the weight balance is lost depending on the position of the electric motor, which causes a problem that an electric brake actuator cannot be attached in a stable state.

In this situation, an object of the invention is to provide a vehicle brake system in which an electric brake actuator thereof can be stably attached with an excellent weight balance and the electric brake actuator can also be disposed with a high space efficiency in a power plant housing room.

Means for Solving the Problems

In order to attain the object, in an aspect of the present invention, a vehicle brake system includes: an input device to which braking operation by an operator is input; and an electric brake actuator for generating a hydraulic brake pressure by driving a hydraulic pressure control piston housed in a cylinder main body by an electric motor, according to at least the braking operation, wherein the input device and the electric brake actuator are mounted on a vehicle, and wherein the electric motor is disposed lower than the cylinder main body.

According to this aspect of the invention, the electric motor for driving the hydraulic pressure control piston that slides inside the cylinder main body can be disposed lower than the cylinder main body.

Accordingly, the heavy electric motor is disposed lower, and the weight of the electric brake actuator is satisfactorily distributed to enable stable attachment of the electric brake actuator with an excellent weight balance.

Further, as the electric motor is disposed lower than the cylinder main body, it is unnecessary to ensure a space for disposing the electric motor, side to the cylinder main body.

In another aspect of the invention, the input device and the electric brake actuator are arranged separately, and at least the electric brake actuator is disposed in a housing room in which a vehicle power unit is housed.

According to this aspect of the invention, the input device and the electric brake actuator can be separately arranged, and further, the electric brake actuator can be disposed in the housing room (power plant housing room) in which the vehicle power unit is housed.

In still another aspect of the invention, the electric motor is disposed in a space formed between the vehicle power unit, the vehicle power unit being disposed between front side members that extend along a front and rear direction on a left side and a right side of the vehicle, and either one of the front side members.

According to this aspect of the invention, the electric motor of the electric brake actuator can be disposed between the vehicle power unit and the front side member. Accordingly, the space between the vehicle power unit and the front side member can be effectively used, and the electric brake actuator can thereby be disposed in the power plant housing room with a high efficiency.

In yet another aspect of the invention, the cylinder main body is disposed in a space formed between the vehicle power unit and either one of the front side members such that an axial direction of the hydraulic pressure control piston is along an extending direction of the either one of the front side members.

According to this aspect of the invention, the cylinder main body of the electric brake actuator can be disposed between the vehicle power unit and the front side member. Accordingly, the space between the vehicle power unit and the front side member can be effectively used, and the electric brake actuator can be disposed in the power plant housing room with a high space efficiency.

In still another aspect of the invention, the electric motor of the electric brake actuator is disposed at a position rotated in a direction getting away from the vehicle power unit, with an axial line of the hydraulic pressure control piston as a center, such that the axial direction of the hydraulic pressure control piston and an output shaft of the electric motor are substantially parallel to each other.

According to this aspect of the invention, the electric motor of the electric brake actuator can be disposed at a position rotated in the direction getting away from the vehicle power unit, with the axial line of the hydraulic pressure control piston as the center of rotation. Accordingly, the electric motor can be disposed in the space on the outer side of the vehicle than the cylinder main body, and the electric brake actuator cab be disposed in the power plant housing room with a high space efficiency.

In another aspect of the invention, at least one portion of the cylinder main body is disposed such as to overlap with the vehicle power unit with respect to an upper and lower direction of the vehicle. Further, the at least one portion of the cylinder main body is disposed higher than the vehicle power unit.

According to this aspect of the invention, at least one portion of the cylinder main body can be disposed higher than the vehicle power unit with an overlap with respect to the upper and lower direction of the vehicle. Accordingly, it is possible to effectively use the space above the vehicle power unit and dispose the electric brake actuator in the power plant housing room with a high space efficiency.

In still another aspect of the invention, the vehicle brake system includes a guard member for protecting the electric motor from an object that is bounced up by running of the vehicle. Further, the guard member is formed integrally with a bracket for attaching the electric brake actuator to the vehicle.

In this aspect of the invention, it is possible to attach a guard member for protecting the electric motor from an object that is bounced up during running of the vehicle. Although the electric motor is in a state of easily coming in contact particularly with objects bounced up from below as the electric motor is disposed below the cylinder main body, it is possible by the guard member to prevent such objects from contacting the electric motor. Further, the guard member can be formed integrally with the bracket for attaching the electric brake actuator to the vehicle.

Advantages of the Invention

According to the invention, it is to provide a vehicle brake system in which an electric brake actuator thereof can be stably attached with an excellent weight balance and the electric brake actuator can also be disposed with a high space efficiency in a power plant housing room.

EMBODIMENT FOR CARRYING OUT THE INVENTION

Figure 1:
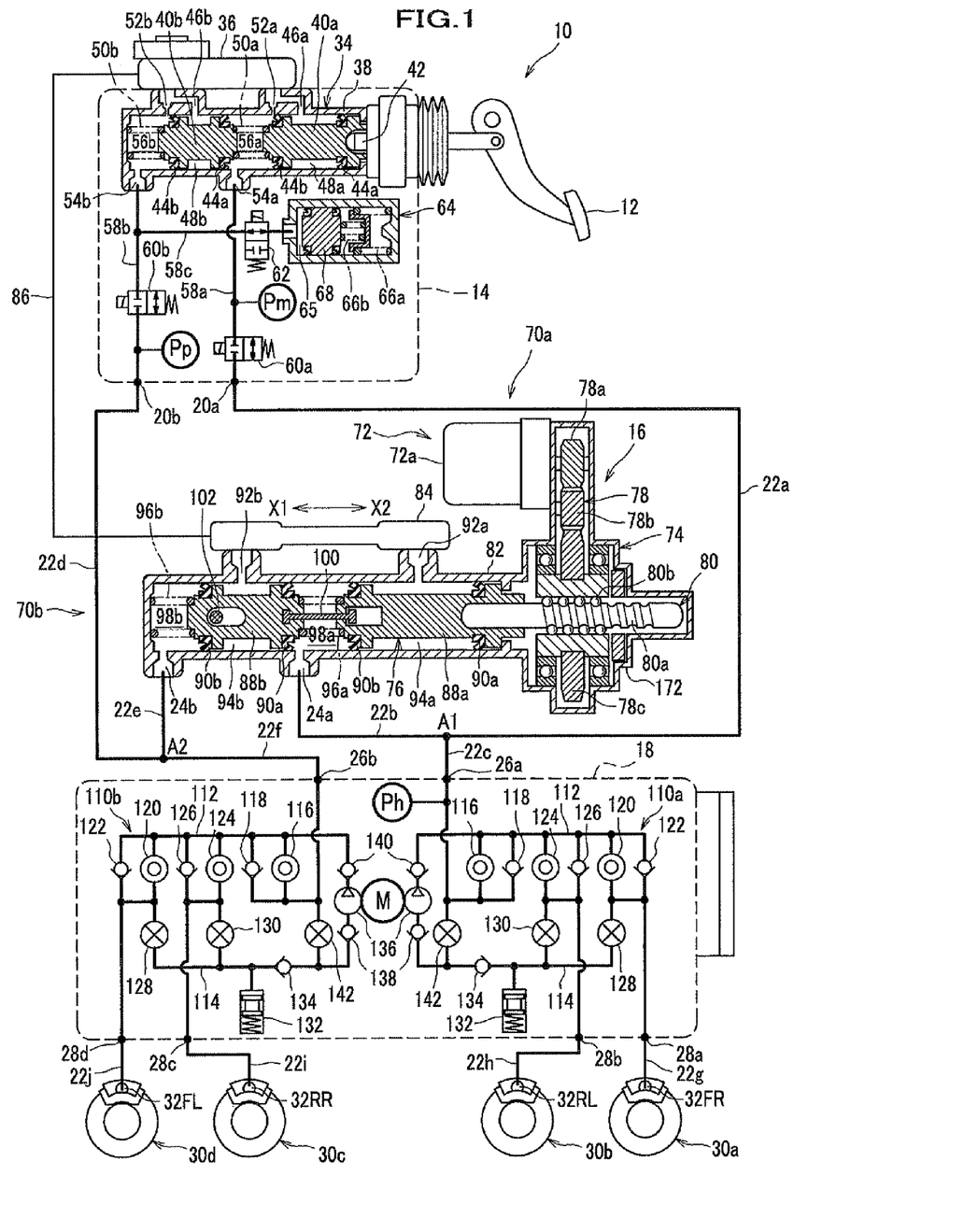
FIG. 1 is a configuration diagram of a vehicle brake system in the present embodiment.

In the following, an embodiment according to the present invention will be described in detail, referring to the drawings, as appropriate. FIG. 1 is a configuration diagram of a vehicle brake system in the present embodiment according to the present invention.

A vehicle brake system 10 shown in FIG. 1 includes two brake systems, one of which is a brake system of a brake by-wire type for a normal use, which operates a brake by transmitting an electric signal, and the other one is a brake system of a conventional hydraulic type for fail-safe, which operates a brake by transmitting a hydraulic pressure.

Accordingly, as shown in FIG. 1, the vehicle brake system 10 is configured basically by an input device 14 for inputting an operation by an operator when a brake operation section, such as a pedal 12, is operated by an operator, an electric brake actuator (a motor cylinder device 16) for controlling (generating) a hydraulic brake pressure, and a vehicle behavior stabilizing device 18 (hereinafter, referred to as the VSA device 18, VSA: registered trademark) for assisting stabilization of the behavior of the vehicle, as separated units.

These devices, namely, the input device 14, the motor cylinder device 16, and the VSA device 18 are connected by hydraulic passages formed by a tube material, for example, a hose or a tube. Further, as a by-wire brake system, the input device 14 and the motor cylinder device 16 are electrically connected by a harness, not shown.

Regarding the hydraulic passages, with a connection point A1 in FIG. 1 (a little lower than the center) as a reference, a connection port 20a of the input device 14 and the connection point A1 are connected by a first piping tube 22a. Further, an output port 24a of the motor cylinder device 16 and the connection point A1 are connected by a second piping tube 22b. Further, an inlet port 26a of the VSA device 18 and the connection point A1 are connected by a third piping tube 22c.

With another connection point A2 in FIG. 1 as a reference, another connection port 20b of the input device 14 and the connection point A2 are connected by a fourth piping tube 22d. Further, another output port 24b of the motor cylinder device 16 and the connection point A2 are connected by a fifth piping tube 22e. Still further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with a wheel cylinder 32FR of a disk brake mechanism 30a provided at the front wheel on the right side. The second outlet port 28b is connected, by an eighth piping tube 22h, with a wheel cylinder 32RL of a disk brake mechanism 30b provided at the rear wheel on the left side. The third outlet port 28c is connected, by a ninth piping tube 22i, with a wheel cylinder 32RR of a disk brake mechanism 30c provided at the rear wheel on the right side. The fourth outlet port 28d is connected, by a tenth piping tube 22j, with a wheel cylinder 32FL of a disk brake mechanism 30d provided at the front wheel on the left side.

In this case, brake fluid is supplied through the piping tubes 22g-22j connected with the respective outlet ports 28a-28d to the respective wheel cylinders 32FR, 32RL, 32RR, and 32FL of the disk brake mechanisms 30a-30d. A rise in the hydraulic pressure in the wheel cylinders 32FR, 32RL, 32RR, or 32FL operates the wheel cylinders 32FR, 32RL, 32RR, or 32FL, and a braking force is applied to the corresponding wheel (the right-side front wheel, the left-side rear wheel, the right-side rear wheel, or the left-side front wheel).

The vehicle brake system 10 is arranged to be mountable on various vehicles including, for example, a vehicle driven only by an engine (internal combustion engine), a hybrid vehicle, an electric vehicle, and a fuel cell vehicle.

Further, the vehicle brake system 10 can be mounted on a vehicle of any driving type, such as a front wheel drive type, a rear wheel drive type, or a four wheel drive type, without limitation of the driving type.

The input device 14 includes a tandem master cylinder 34 capable of generating a hydraulic pressure by an operator's operation of the brake pedal 12 and a first reservoir 36 provided at the master cylinder 34. Inside a cylinder tube 38 of the master cylinder 34, two pistons 40a and 40b are slidably arranged, wherein the two pistons 40a and 40b are separated from each other with a certain distance along the axial direction of the cylinder tube 38. The one piston 40a is disposed adjacent to the brake pedal 12 and is connected with the brake pedal 12 through a push rod 42. The other piston 40b is disposed with a longer distance than the piston 40a from the brake pedal 12.

A pair of piston packings 44a and 44b is attached to the outer circumferential surfaces of the one and the other pistons 40a and 40b through an annular stepped portion. Back chambers 48a and 48b communicated with later-described supply ports 46a and 46b are formed between the pair of packings 44a and 44b. Further, a spring member 50a is arranged between the one and the other pistons 40a and 40b. Another spring member 50b is arranged between the other piston 40b and the side end portion of the cylinder tube 38.

Incidentally, piston packings 44a and 44b may be attached to the inner wall of the cylinder tube 38.

The cylinder tube 38 of the master cylinder 34 is provided with two supply ports 46a and 46b, two relief ports 52a and 52b, and two output ports 54a and 54b. In this case, the respective supply ports 46a (46b), and the respective relief ports 52a (52b), are arranged to respectively join with each other and communicate with a reservoir chamber, not shown, in the first reservoir 36.

Further, inside the cylinder tube 38 of the master cylinder 34, a first pressure chamber 56a and a second pressure chamber 56b are provided to generate a hydraulic brake pressure according to a braking effort applied by the operator to the brake pedal 12. The first pressure chamber 56a is arranged such as to communicate with the connection port 20a through a first hydraulic pressure passage 58a. The second pressure chamber 56b is arranged such as to communicate with the other connection port 20b through a second hydraulic pressure passage 58b.

A pressure sensor Pm is provided between the master cylinder 34 and the connection port 20a and on the upstream side of the first hydraulic pressure passage 58a. A first shut-off valve 60a of a solenoid valve of a normally open type is provided on the downstream side of the first hydraulic pressure passage 58a. This pressure sensor Pm detects the hydraulic pressure on the upstream side, which is the master cylinder 34 side of the first shut-off valve 60a, on the first hydraulic pressure passage 58a.

Between the master cylinder 34 and the other connection port 20b, a second shut-off valve 60b of a solenoid valve of a normally open type is arranged on the upstream side of the second hydraulic pressure passage 58b, and a pressure sensor Pp is arranged on the downstream side of the second hydraulic passage 58b. On the second hydraulic passage 58b, this pressure sensor Pp detects the hydraulic pressure on the downstream side of the second shut-off valve 60b, in other words, on the side of the wheel cylinders 32FR, 32RL, 32RR, and 32FL.

The normal openness of the first shut-off valve 60a and the second shut-off valve 60b refers to the type of a valve configured such that the normal position (the position of the valve body when current is not applied) is in a state of being at an open position (always open). Incidentally, in FIG. 1, the first shut-off valve 60a and the second shut-off valve 60b are shown in a close state in which a current is applied to the solenoids, and the valve bodies, not shown, are thereby operating.

At a point between the master cylinder 34 and the second shut-off valve 60b, the second hydraulic pressure passage 58b is provided with a branched hydraulic passage 58c branching from the second hydraulic pressure passage 58b. To the branched hydraulic passage 58c, serially connected are a third shut-off valve 62 of a solenoid valve of a normally close type and a stroke simulator 64. The normal closing of the third shut-off valve 62 refers to the type of a valve configured such that the normal position (the position of the valve body when current is not applied) is in a state of being at a closed position (always closed). Incidentally, in FIG. 1, the third shut-off valve 62 is shown in a valve open state in which a current is applied to the solenoid, and the valve body, not shown, is thereby operating.

The stroke simulator 64 is a device that makes an operator feel as if a braking force were generated by a braking effort, by generating a stroke and a reaction force of the brake during by-wire control. The stroke simulator 64 is disposed on the second hydraulic pressure passage 58b and on the master cylinder 34 side of the second shut-off valve 60b. The stroke simulator 64 is provided with a hydraulic pressure chamber 65 communicating with the branched hydraulic passage 58c, and is arranged such as to be able to suck brake fluid let out through the hydraulic pressure chamber 65 from the second pressure chamber 56b of the master cylinder 34.

Further, the stroke simulator 64 includes a first return spring 66a with a larger spring constant, a second return spring 66b with a smaller spring constant, the first and the second springs 66a and 66b being serially disposed with each other, and a simulator piston 68 urged by the first and second return springs 66a and 66b. The stroke simulator 64 is arranged such that the increase gradient of the pedal reaction force is set low during an early stage of pedaling the brake pedal 12, and the pedal reaction force is set high during a later stage of pedaling, so that the pedal feeling of the brake pedal 12 becomes equivalent to that of a time when an existing master cylinder 34 is pedaled.

The configuration of the hydraulic pressure passages is roughly categorized into a first hydraulic system 70a that connects the first pressure chamber 56a of the master cylinder 34 and the plurality of wheel cylinders 32FR and 32RL, and a second hydraulic system 70b that connects the second pressure chamber 56b of the master cylinder 34 and the plurality of wheel cylinders 32RR and 32FL.

The first hydraulic system 70a is configured by the first hydraulic pressure passage 58a connecting the output port 54a of the master cylinder 34 (cylinder tube 38) of the input device 14 and the connection port 20a, the piping tubes 22a and 22b connecting the connection port 20a of the input device 14 and the output port 24a of the motor cylinder device 16, the piping tubes 22b and 22c connecting the output port 24a of the motor cylinder device 16 and the inlet port 26a of the VSA device 18, and the piping tubes 22g and 22h connecting the outlet ports 28a and 28b of the VSA device 18 and the respective wheel cylinders 32FR and 32RL.

The second hydraulic system 70b includes the second hydraulic pressure passage 58b connecting the output port 54b of the master cylinder 34 (cylinder tube 38) of the input device 14 and the other connection port 20b, the piping tubes 22d and 22e connecting the other connection port 20b of the input device 14 and the output port 24b of the motor cylinder device 16, the piping tubes 22e and 22f connecting the output port 24b of the motor cylinder device 16 and the inlet port 26b of the VSA device 18, and the piping tubes 22i and 22j for connecting the outlet ports 28c and 28d of the VSA device 18 and the respective wheel cylinders 32RR and 32FL.

The motor cylinder device 16 includes an actuator mechanism 74 having an electric motor 72 and a cylinder mechanism 76 urged by the actuator mechanism 74.

The actuator mechanism 74 is provided on the output shaft side of the electric motor 72, and provided with a gear mechanism (decelerating mechanism) 78 for transmitting the rotational driving force of the electric motor 72 by engagements between plural gears, and a ball screw assembly 80 that includes a ball screw shaft 80a, which moves forward and backward along the axial direction by the transmission of the rotational driving force through the gear mechanism 78, and balls 80b.

In the present embodiment, the ball screw assembly 80 is housed in an actuator housing 172 together with the gear mechanism 78.

The cylinder mechanism 76 includes the cylinder main body 82 substantially in a cylindrical shape and a second reservoir 84 arranged at the cylinder main body 82. The second reservoir 84 is connected by a piping tube 86 with the first reservoir 36 arranged at the master cylinder 34 of the input device 14. Brake fluid reserved in the first reservoir 36 is supplied to the second reservoir 84 through the piping tube 86. Incidentally, a tank for reserving brake fluid may be provided for the piping tube 86.

The first slave piston 88a and the second slave piston 88b are slidably arranged inside the cylinder main body 82, wherein the slave pistons 88a and 88b are separated from each other with a certain distance along the axial direction of the cylinder main body 82. The first slave piston 88a is disposed adjacent to the ball screw assembly 80 side, is in contact with one end portion of the ball screw shaft 80a, and moves in the direction arrow X1 or X2 integrally with the ball screw shaft 80a. The second slave piston 88b is disposed farther than the slave piston 88a from the ball screw assembly 80 side.

Incidentally, in the present embodiment, each of the slave piston 88a and the slave piston 88b constructs a hydraulic pressure control piston described in claims.

The electric motor 72 in the present embodiment is arranged such as to be covered by a motor casing 72a formed separately from the cylinder main body 82, wherein an output shaft, not shown, is disposed substantially in parallel with the sliding direction (axial direction) of the slave piston 88a and the slave piston 88b. That is, the electric motor 72 is disposed such that the axial direction of the output shaft is substantially in parallel with the axial direction of the hydraulic pressure control pistons.

An arrangement is made such that the rotational driving of the output shaft, not shown, is transmitted to the ball screw assembly 80 through the gear mechanism 78.

The gear mechanism 78 is, for example, configured by a first gear 78a attached to the output shaft of the electric motor 72, a third gear 78c for rotating the balls 80b, which makes the ball screw shaft 80a move forward and backward along the axial direction, with the axial line of the ball screw shaft 80a as the center, and a second gear 78b for transmitting a rotation of the first gear 78a to the third gear 78c, wherein the third gear 78c rotates around the axial line of the ball screw shaft 80a. Accordingly, the rotational axis of the third gear 78c is the ball screw shaft 80a and is parallel to the sliding direction (axial direction) of the hydraulic pressure control pistons (the first slave piston 88a and the second slave piston 88b).

As described above, as the output shaft of the electric motor 72 and the axial direction of the hydraulic pressure control pistons are substantially parallel to each other, the output shaft of the electric motor 72 and the rotational shaft of the third gear 78c are substantially parallel to each other.

By arranging the rotational axis of the second gear 78b such to be substantially parallel to the output shaft of the electric motor 72, the output shaft of the electric motor 72, the rotational axis of the second gear 78b, and the rotational axis of the third gear 78c are disposed substantially parallel to each other.

With such an arrangement, the electric motor 72 can be disposed at a position with an arbitrary rotation with the axial line of the first slave piston 88a and the second slave piston 88b as the rotational center.

A pair of slave piston packings 90a and 90b are attached on the outer circumferential surfaces of the first and second slave pistons 88a and 88b through an annular stepped portion. A first back chamber 94a and a second back chamber 94b are formed, which are respectively communicated with later-described reservoir ports 92a and 92b, are formed between the pair of the slave piston packings 90a and 90b. Further, a first return spring 96a is arranged between the first and second slave pistons 88a and 88b, and a second return spring 96b is arranged between the second slave piston 88b and the side end portion of the cylinder main body 82.

The cylinder main body 82 of the cylinder mechanism 76 is provided with the two reservoir ports 92a and 92b and the two output ports 24a and 24b. In this case, the reservoir port 92a (92b) is arranged such as to communicate with a reservoir chamber, not shown, in the second reservoir 84.

A first hydraulic pressure chamber 98a is provided in the cylinder main body 82 to control the hydraulic brake pressure that is output from the output port 24a to the wheel cylinders 32FR and 32RL side. Further, a second hydraulic pressure chamber 98b is provided in the cylinder main body 82 to control the hydraulic brake pressure that is output from the other output port 24b to the wheel cylinders 32RR and 32FL side.

Restricting means 100 is provided between the first slave piston 88a and the second slave piston 88b to restrict the maximum stroke (the maximum displacement distance) and the minimum stroke (the minimum displacement distance) of the slave piston 88a and the slave piston 88b. Further, the second slave piston 88b is provided with a stopper pin 102 that restricts the sliding range of the second slave piston 88b, and inhibits over return of the slave piston 88b to the slave piston 88a side. Thus, the restricting means 100 and the stopper pin 102 prevent a defect of another system at the time of a defect of one system, particularly at the time of backup when braking is carried out the master cylinder 34.

The VSA device 18 is a known one and includes a first brake system 110a for control of the first hydraulic system 70a connected to the disk brake mechanisms 30a and 30b (wheel cylinders 32FR and 32RL) for the right-side front wheel and the left-side rear wheel. Further, the VSA device 18 includes a second brake system 110b for control of the second hydraulic system 70b connected to the disk brake mechanisms 30c and 30d (wheel cylinders 32RR and 32FL) for the right-side rear wheel and the left-side front wheel. Incidentally, the first brake system 110a may be formed by a hydraulic system connected to disk brake mechanisms arranged at the left-side front wheel and the right-side front wheel, and the second brake system 110b may be formed by a hydraulic system connected to disk brake mechanisms arranged at the left-side rear wheel and the right-side rear wheel. Further, the first brake system 110a may be formed by a hydraulic system connected to disk brake mechanisms arranged at the right-side front wheel and the right-side rear wheel on one side of the vehicle body, and the second brake system 110b may be formed by a hydraulic system connected to disk brake mechanisms arranged at the left-side front wheel and the left-side rear wheel on the other one side of the vehicle body.

As the first brake system 110a and the second brake system 110b have the same structure, the same reference symbols are assigned to elements corresponding between the first brake system 110a and the second brake system 110b. In the following, the first brake system 110a will be mainly described while describing the second brake system 110b with bracketed notes.

The first brake system 110a (the second brake system 110b) has a first shared hydraulic passage 112 and a second shared hydraulic passage 114 shared by the wheel cylinders 32FR and 32RL (32RR and 32FL). The VSA device 18 includes a regulator valve 116, which is a normal-open type solenoid valve disposed between the inlet port 26a and the first shared hydraulic passage 112, a first check valve 118 that is arranged in parallel with the regulator valve 116 to allow the brake fluid to flow from the inlet port 26a side to the first shared hydraulic passage 112 side (while inhibiting the brake fluid from flowing from the first shared hydraulic passage 112 side to the inlet port 26a side), and a first invalve 120, which is a normally open type solenoid valve disposed between the first shared hydraulic passage 112 and the first outlet port 28a. Further, the VSA device 18 includes a second check valve 122 that allows the brake fluid to flow from the first outlet port 28a side to the first shared hydraulic passage 112 side (while inhibiting the brake fluid from flowing from the first shared hydraulic passage 112 side to the first outlet port 28a side), the second check valve 122 being arranged parallel with the first invalve 120, a second invalve 124, which is a normally open type solenoid valve disposed between the first shared hydraulic passage 112 and the second outlet port 28b, and a third check valve 126 that allows the brake fluid to flow from the second outlet port 28b side to the first shared hydraulic passage 112 side (while inhibiting the brake fluid from flowing from the first shared hydraulic passage 112 side to the second outlet port 28b side), the third check valve 126 being arranged parallel to the second invalve 124.

Still further, the VSA device 18 includes a first outvalve 128, which is a normally closed type solenoid valve disposed between the first outlet port 28a and the second shared hydraulic passage 114, a second outvalve 130, which is a normally closed type solenoid valve disposed between the second outlet port 28b and the second shared hydraulic passage 114, a reservoir 132 connected to the second shared hydraulic passage 114, a fourth check valve 134 that is disposed between the first shared hydraulic passage 112 and the second shared hydraulic passage 114 to allow the brake fluid to flow from the second shared hydraulic passage 114 side to the first shared hydraulic passage 112 side (while inhibiting the brake fluid from flowing from the first shared hydraulic passage 112 side to the second shared hydraulic passage 114 side), a pump 136 that is disposed between the fourth check valve 134 and the first shared hydraulic passage 112 to supply the brake fluid from the second shared hydraulic passage 114 side to the first shared hydraulic passage 112 side, a suction valve 138 and a discharge valve 140 provided before and after the pump 136, a motor M for driving the pump 136, and a suction valve 142 disposed between the second shared hydraulic passage 114 and the inlet port 26a.

Incidentally, in the first brake system 110a, a pressure sensor Ph is provided on the hydraulic passage adjacent to the inlet port 26a to detect the hydraulic brake pressure having been output from the output port 24a of the motor cylinder device 16 and controlled by the first hydraulic pressure chamber 98a of the motor cylinder device 16. Detection signals detected by the respective pressure sensors Pm, Pp, and Ph are introduced to control means, not shown. Further, the VSA device 18 can perform ABS (Anti-lock brake system) control in addition to VSA control.

Further, an arrangement also may be made by connecting an ABS unit provided with only an ABS function.

The vehicle brake system 10 in the present embodiment is basically configured as described above, and the operation and advantages thereof will be described below.

During normal operation when the vehicle brake system 10 normally functions, the first shut-off valve 60a and the second shut-off valve 60b, which are normally open type solenoid valves, turn into a valve close state by being magnetically excited, and the third shut-off valve 62, which is a normally closed type solenoid valve, turns into a valve open state by being magnetically excited. Accordingly, as the first hydraulic system 70a and the second hydraulic system 70b are shut off by the first shut-off valve 60a and the second shut-off valve 60b, it does not occur that a hydraulic brake pressure generated by the master cylinder 34 of the input device 14 is transmitted to the wheel cylinders 32FR, 32RL, 32RR, and 32FL of the disk brake mechanisms 30a-30d.

At this moment, a hydraulic brake pressure generated by the second pressure chamber 56b of the master cylinder 34 is transmitted through the branched hydraulic passage 58c and the third shut-off valve 62 in the valve open state to the hydraulic pressure chamber 65 of the stroke simulator 64. The hydraulic brake pressure supplied to the hydraulic pressure chamber 65 displaces the simulator piston 68 against the spring forces of the springs 66a and 66b, and a stroke of the brake pedal 12 is thereby allowed and a pseudo petal reaction force is generated to be applied to the brake pedal 12. As a result, a brake feeling without a strange feeling for a driver can be obtained.

In such a system state, when the control means, not shown, has detected pedaling of the brake pedal 12 by the operator, the control means drives the electric motor 72 of the motor cylinder device 16 to urge the actuator mechanism 74, and displaces the first slave piston 88a and the second slave piston 88b toward the direction arrow X1 in FIG. 1 against the spring forces of the first return spring 96a and the second return spring 96b. By the displacements of the first slave piston 88a and the second slave piston 88b, the hydraulic brake pressures inside the first hydraulic pressure chamber 98a and the second hydraulic pressure chamber 98b are increased, balancing with each other, and a desired hydraulic brake pressure is thus generated.

Concretely, the control means, not shown, computes the pedaling operation amount of the brake pedal 12, according to a detection value by the pressure sensor Pm, and controls the motor cylinder device 16 to generate a hydraulic brake pressure corresponding to this pedaling operation amount.

Then, the hydraulic brake pressure generated by the motor cylinder device 16 is supplied from the inlet ports 26a and 26b to the VSA device 18. That is, the motor cylinder device 16 drives the first slave piston 88a and the second slave piston 88*b* by the rotational driving force of the electric motor 72, which rotationally drives by an electric signal when the brake pedal 12 is operated, generates a hydraulic brake pressure, according to an operation amount of the brake pedal 12, and supplies the hydraulic brake pressure to the VSA device 18.

An electric signal in the present embodiment is a control signal, for example, for controlling the power to drive the electric motor 72 or controlling the electric motor 72.

Incidentally, the manner of computing, by the control means not shown, a pedaling amount of the brake pedal 12 from a detection value by the pressure sensor Pm is not limited, and for example, referring to a map representing the relationship between a detection value by the pressure sensor Pm and a pedaling operation amount of the brake pedal 12, a pedaling operation amount of the brake pedal 12 according to a detection value by the pressure sensor Pm may be computed. Such a map is desired to be set in advance by experimental measurement or the like during designing.

Further, operation amount detecting means for detecting the pedaling operation amount of the brake pedal 12 is not limited to the pressure sensor Pm, and may be, for example, a sensor (stroke sensor or the like) for detecting the stroke amount of the brake pedal 12.

These hydraulic brake pressures of the first hydraulic pressure chamber 98*a* and the second hydraulic pressure chamber 98*b* in the motor cylinder device 16 are transmitted through the first invalve 120 and the second invalve 124 of the VSA device 18 which are in the valve open state, to the wheel cylinders 32FR, 32RL, 32RR, and 32FL of the disk brake mechanisms 30*a*-30*d*. By operation of the wheel cylinders 32FR, 32RL, 32RR, and 32FL, desired braking forces are applied to the respective wheels.

In other words, by the vehicle brake system 10 in the present embodiment, during a normal state when the motor cylinder device 16 that functions as a dynamic hydraulic pressure source, control means not shown for by-wire control, and the like are operable, a so-called brake by-wire type brake system becomes active wherein in a state that communication between the master cylinder 34, which generates a hydraulic brake pressure by an operator's pedaling of the brake pedal 12, and the disk brake mechanisms 30*a*-30*d* (wheel cylinders 32FR, 32RL, 32RR, an 32FL) that brake the respective wheels are shut off by the first shut-off valve 60*a* and the second shut-off valve 60*b*, the disk brake mechanisms 30*a*-30*d* are operated by the hydraulic brake pressure generated by the motor cylinder device 16. Accordingly, the present embodiment can be suitably applied to a vehicle, such as an electric vehicle or the like, in which a negative pressure that could be caused by a conventional internal combustion engine does not exist.

On the other hand, during an abnormal state when the motor cylinder device 16 or the like is inoperable, a so-called conventional hydraulic type brake system becomes active, wherein the first shut-off valve 60*a* and the second shut-off valve 60*b* are respectively made in a valve open state, and the third shut-off valve 62 is made in a valve close state so as to transmit a hydraulic brake pressure generated by the master cylinder 34 to the disk brake mechanisms 30*a*-30*d* (wheel cylinders 32FR, 32RL, 32RR, 32FL) and thereby operate the disk brake mechanisms 30*a*-30*d* (wheel cylinders 32FR, 32RL, 32RR, and 32FL).

For example, a hybrid automobile or an electric automobile, which includes a running electrical machine (running motor), can be provided with a regenerative brake for generating a braking force by regenerating power by an electrical machine for running. In a case of arrangement such that, when the brake pedal 12 is operated, a braking force is generated by a regenerative brake in addition to a braking force generated by the disk brake mechanisms 30*a*-30*d*, if the wheel cylinders 32FR, 32RL, 32RR, and 32FL are made operate with hydraulic brake pressure generated by the first pressure chamber 56*a* and the second pressure chamber 56*b* of the master cylinder 34, the brake force generated by the regenerative brake becomes an excessive braking force, and a braking force larger than a braking force that the operator intends to generate is generated.

In order to avoid such a state, the control means, not shown, preferably generates a hydraulic brake pressure by the motor cylinder device 16 such as to combine a braking force generated by the disk brake mechanism 30*a*-30*d* and a braking force generated by the regenerative brake, thereby generating a satisfactory braking force. A satisfactory braking force can be generated by providing a hybrid automobile or an electric automobile with the vehicle brake system 10 controlled by control means in such a manner.

Figure 2:
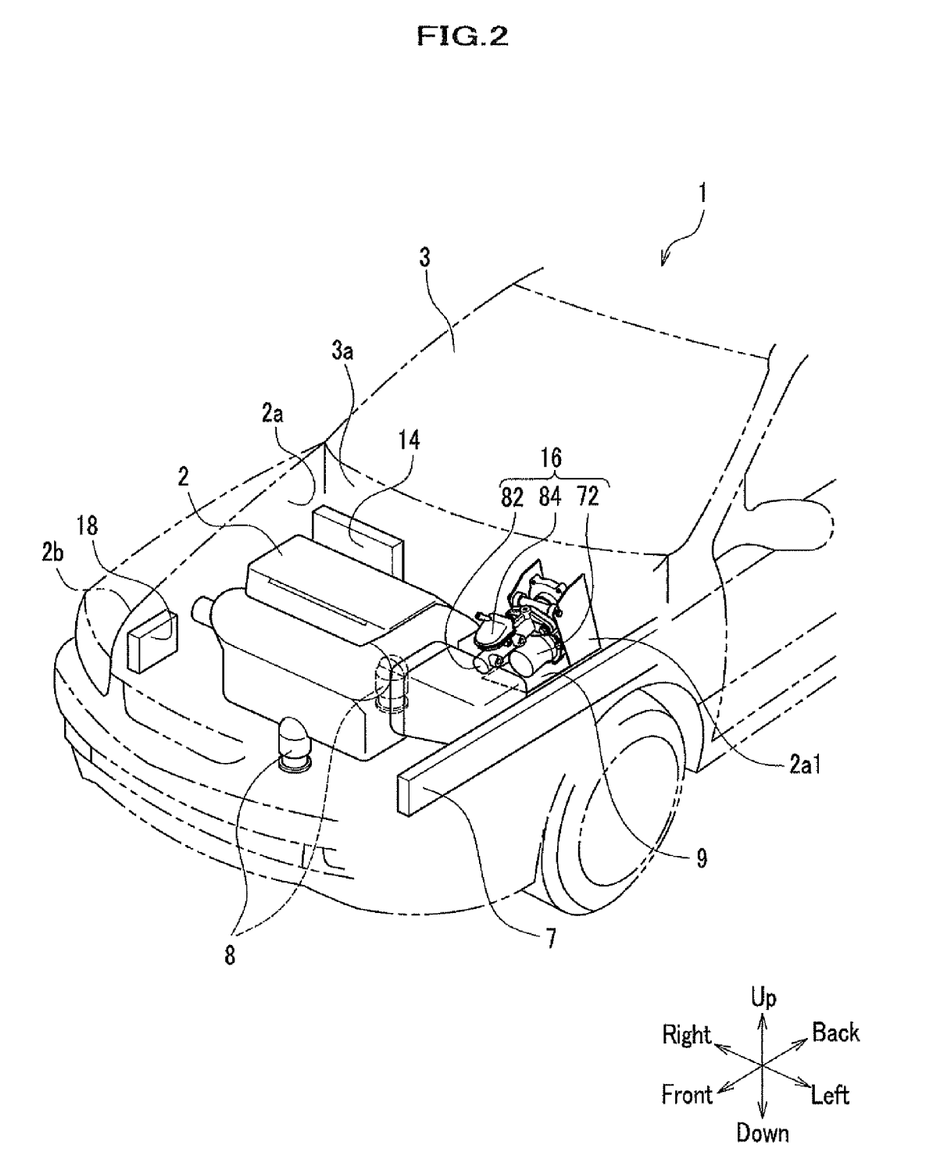
FIG. 2 is a perspective view showing a state that a motor cylinder device is disposed in a power plant housing room.
Figure 3:
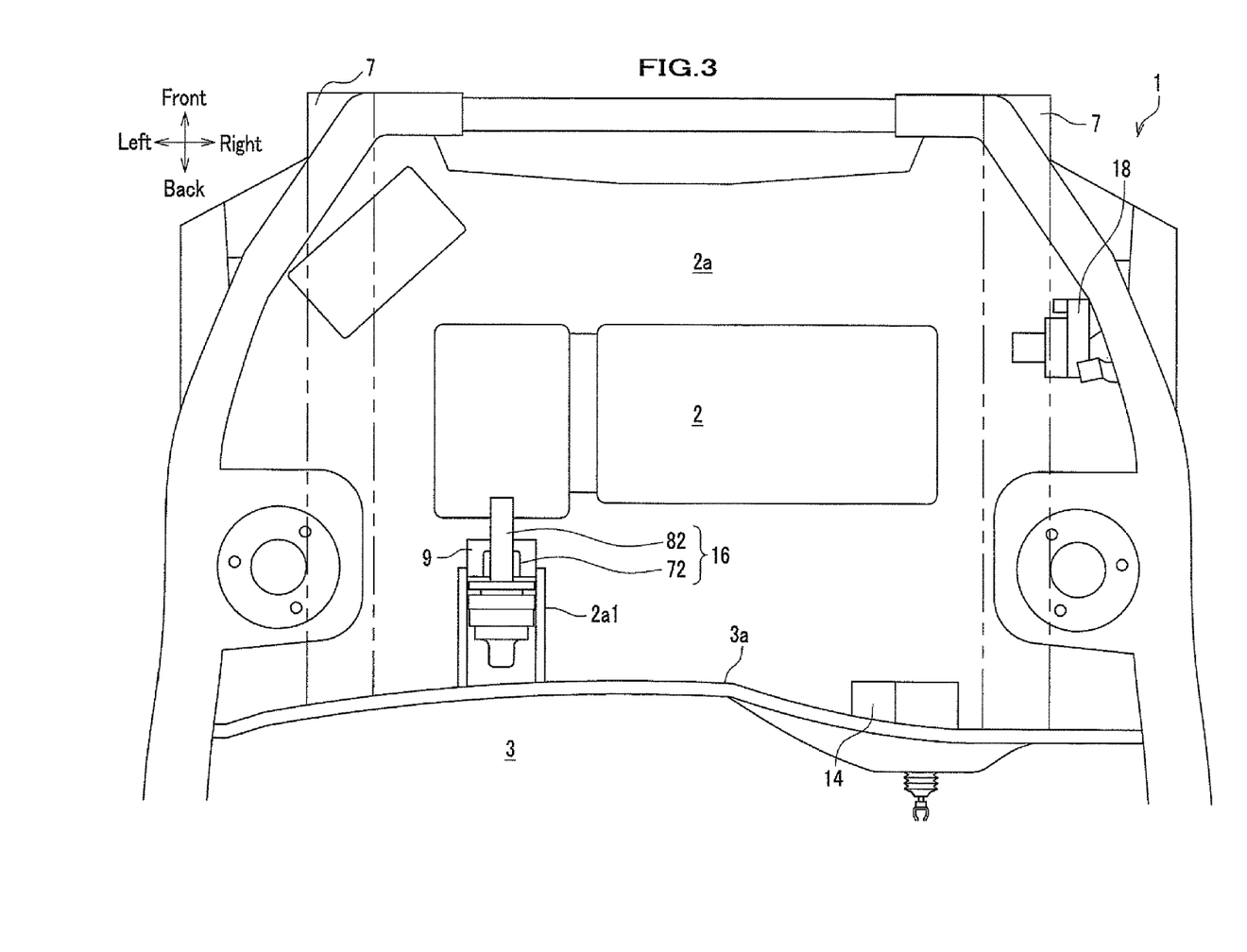
FIG. 3 is a plan view of the power plant housing room where the motor cylinder device is disposed.

In case that the vehicle brake system 10 with such an arrangement is mounted on a vehicle, for example as shown in FIGS. 2 and 3, the input device 14, the motor cylinder device 16, and the VSA device 18 are configured in separate bodies and disposed in a housing room (power plant housing room 2*a*), in which the power plant 2 of the vehicle 1 is housed, in a state of being appropriately dispersed, thus being attached to the housing room. The power plant 2 is a vehicle power unit for generating a power for running the vehicle 1, and is an internal combustion engine, a running electric machine provided on an electric automobile, an integrated unit of an internal combustion engine and a running electric machine provided on a hybrid automobile, or the like.

The power plant housing room 2*a* is formed, for example on the front side of the vehicle 1, being partitioned by a living space (cabin 3) for an operator and other passengers and a dashboard 3*a*. The power plant housing room 2*a* houses the power plant 2, the vehicle brake system 10 (the input device 14, the motor cylinder device 16, the VSA device 18), and in addition, auxiliary units, not shown, Further, on the top of the power plant housing room 2*a*, a housing room cover 2*b* is arranged being openable/closeable.

Front side members 7 extend on the left and right sides of the power plant housing room 2*a*, wherein the front side members 7 are arranged, extending along the front/rear direction on the left and right sides of the vehicle 1.

Incidentally, the respective directions rear/front, upper/lower, and left/right represent the rear/front, upper/lower, and left/right directions of the vehicle 1. For example, the upper/lower direction (vehicle upper/lower direction) refers to the vertical direction at the vehicle 1 on a horizontal plane, and the left/right direction refers to the left/right direction in a view from the rear toward the front of the vehicle 1.

The power plant 2 is disposed between the left/right front side members 7 in the power plant housing room 2*a*, and is supported by an antivibration support device 8 fixed to a sub-frame, not shown. A space is formed in the left/right direction between the left/right front side members 7 and the power plant 2.

Further, a space is formed above the power plant 2 between the power plant 2 and the housing room cover 2*b*.

In the present embodiment, the input device 14, the motor cylinder device 16, and the VSA device 18, which are configured in separate bodies, are housed in the power plant housing room 2*a*, and the motor cylinder device 16 is attached such that a part of the cylinder main body 82 is disposed in a space formed between the power plant 2 and the housing room cover 2b. Further, the electric motor 72 is disposed lower than the cylinder main body 82. That is, the power plant 2 and the cylinder main body 82 are disposed such as to overlap with each other at least partially with respect to the vehicle upper/lower direction.

Incidentally, in the present embodiment, a state that the electric motor 72 is disposed lower than the cylinder main body 82 refers to a state that the electric motor 72 is disposed such that the axial line of the output shaft (not shown), which is disposed substantially parallel to the axial direction of the first slave piston 88a and the second slave piston 88b (the hydraulic pressure control pistons) on either the left side or right side of the vehicle 1 (see FIG. 2), shown in FIG. 1, is lower in the vehicle upper/lower direction than the axial line of the first slave piston 88a and the second slave piston 88b.

Figure 4:
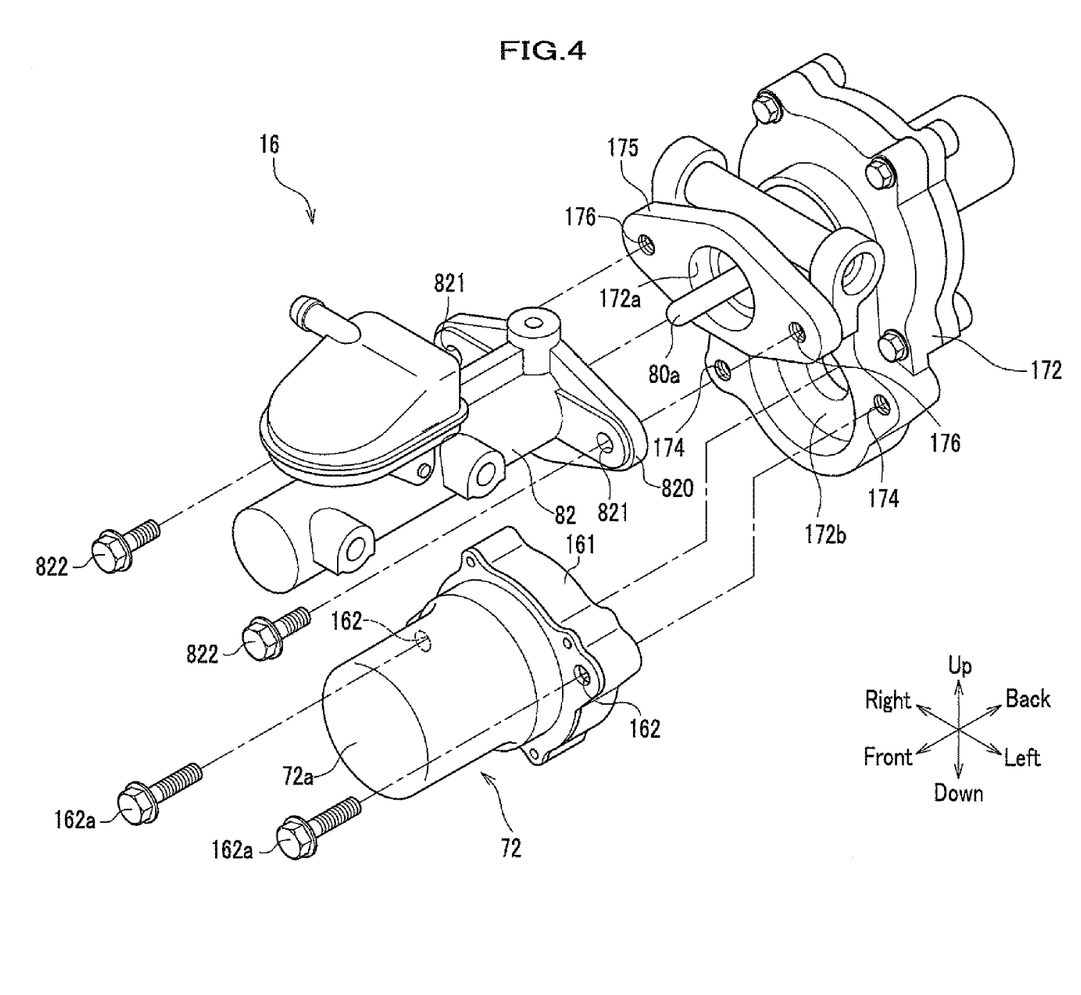
FIG. 4 is an exploded perspective view of the motor cylinder device.

As shown in FIG. 4, the motor cylinder device 16 in the present embodiment is structured such that the actuator housing 172, which houses the gear mechanism 78 (see FIG. 1) and the ball screw assembly 80 (see FIG. 1), and the cylinder main body 82 are dividable with the plane substantially perpendicular to the axial line of the cylinder main body 82 as a dividing plane. The motor cylinder device 16 is structured such that the cylinder main body 82 is connected to the actuator housing 172, and the electric motor 72 is attached to the actuator housing 172.

The cylinder main body 82 is connected to the front of the actuator housing 172. Concretely, the actuator housing 172 is provided with an opening portion 172a opening forward through which the ball screw shaft 80a forward protrudes. The cylinder main body 82 is connected with the front of the actuator housing 172 wherein a hollow portion (not shown), in which the first slave piston 88a (see FIG. 1) and the second slave piston 88b (see FIG. 1) slide, communicates with the opening portion 172a.

For example, the actuator housing 172 is arranged such that a flange portion 175 formed by extension of the periphery of the opening portion 172a in the left/right direction, and, for example, two screw holes 176 are open through the flange portion 175.

On the other hand, the end portion of the cylinder main body 82, the end portion being on the actuator housing 172 side, is also extending in the left/right direction to form a flange portion 820. The flange portion 820 is provided with cylinder attaching holes 821 at the positions corresponding to the screw holes 176 of the actuator housing 172.

The flange portion 820 of the cylinder main body 82 and the flange portion 175 of the actuator housing 172 are disposed such as to face each other, and fastening members 822, such as bolts, are screwed into the screw holes 176 through the cylinder attaching holes 821 from the cylinder main body 82 side so that the cylinder main body 82 is fixed to the actuator housing 172 by fastening.

In such a manner, the cylinder main body 82 is connected to the front of the actuator housing 172, and the ball screw shaft 80a protruding from the opening portion 172a contacts with the first slave piston 88a (see FIG. 1) inside the cylinder main body 82.

Further, the electric motor 72 is attached, below the cylinder main body 82, to the actuator housing 172 such that the axial direction of the output shaft, not shown, is parallel to the axial direction of the first slave piston 88a (see FIG. 1) and the second slave piston 88b (see FIG. 1), in other words, the axial direction of the cylinder main body 82.

For example, the second gear 78b (see FIG. 1) is disposed lower than the third gear 78c (see FIG. 1), and the actuator housing 172 is extending downward to house the third gear 78c and the second gear 78b. Further, the actuator housing 172 has a first gear room 172b in which the first gear 78a is housed such as to be engageable with the second gear 78b, wherein the first gear room 172b is open at the front and disposed lower than the second gear 78b.

The electric motor 72 is attached to the actuator housing 172 from front such that the first gear 78a (see FIG. 1) attached to the output shaft, not shown, is housed in the first gear room 172b and engages with the second gear 78b.

The structure where the electric motor 72 is attached to the actuator housing 172 is not limited thereto.

For example, the motor casing 72a has a structure where the end portion on the actuator housing 172 side extends peripherally to form a flange portion 161, and the flange portion 161 is provided with motor attaching holes 162 which fastening members 162a, such as bolts, penetrate through.

The actuator housing 172 has screw holes 174 at the positions corresponding to the motor attaching holes 162.

The electric motor 72 is attached to the actuator housing 172 from the front side (the same side as the side where the cylinder main body 82 is connected) such that the output shaft (not shown) to which the first gear 78a (see FIG. 1) is attached is substantially parallel with the axial direction of the cylinder main body 82 and the first gear 78a is housed in the first gear room 172b to engage with the second gear 78b (see FIG. 1). Further, the fastening members 162a are screwed into the screw holes 174 through the motor attaching holes 162 from the electric motor 72 side, and the motor casing 72a is thus fixed to the actuator housing 172 by fastening.

By this arrangement, the cylinder main body 82 and the electric motor 72 are disposed on the same side of the actuator housing 172.

In such a manner, the motor cylinder device 16 in the present embodiment is arranged such that the cylinder main body 82 is connected to the actuator housing 172, and further, the electric motor 72 is attached such as to be disposed lower than the cylinder main body 82.

If the electric motor 72 is disposed lower than the cylinder main body 82 in such a manner, it may occur that a foreign object or matter such as a pebble or gravel bounce up into the power plant housing room 2a from below mainly from a road surface when the vehicle 1 runs, or water splashes into the power plant housing room 2a from below when the vehicle 1 runs on a puddle, and the electric motor 72 is thus hit.

In this situation, for example, arrangement may be made such that a guard member (an under-guard 9) in a plate shape is attached under the electric motor 72 so that a foreign object or matter such as a pebble, gravel, water splash or the like, which is bounced up by running of the vehicle 1 to enter the power plant housing room 2a, does not hit the electric motor 72. Such an under-guard 9 can be formed integrally, for example, with a bracket 2a1.

The motor cylinder device 16 is, for example, attached to the dashboard 3a of the power plant housing room 2a through the bracket 2a1. The structure of fixing the motor cylinder device 16 in the power plant housing room 2a is not limited, and may be a structure of attaching the motor cylinder device 16 to a sub-frame, not shown, or the like.

Figure 5:
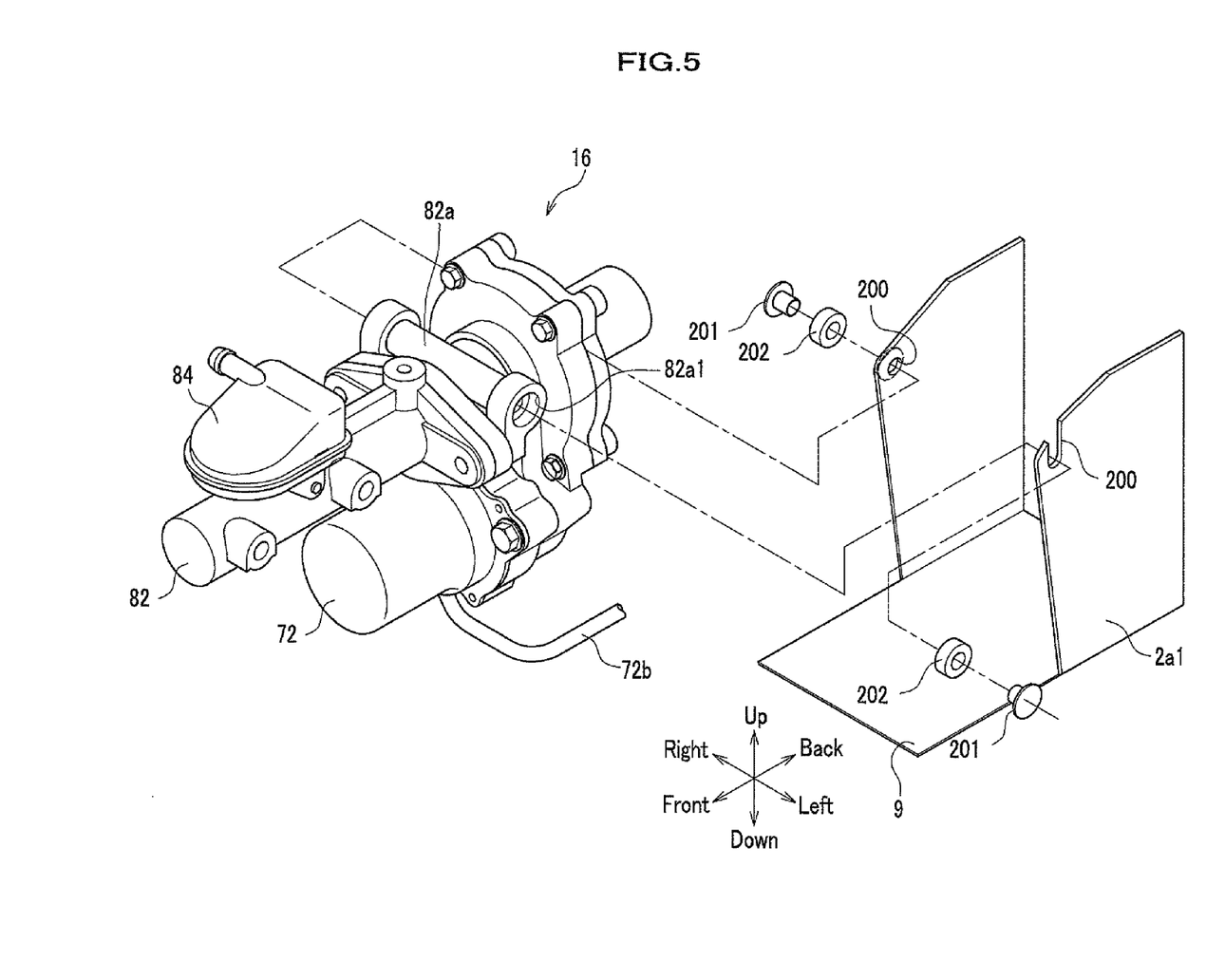
FIG. 5 shows an example of arrangement of attaching the motor cylinder device to a bracket.

As an example, the motor cylinder device 16 may be attached to a bracket 2a1 formed as shown in FIG. 5.

For example, fixing bosses 82a protruding in the left/right direction, in which a screw hole 82a1 is processed, are formed on the cylinder main body 82 of the motor cylinder device 16.

The bracket 2a1 is substantially in a U-shape opening upward in a view from the front, and sandwiches the fixing boss 82a of the cylinder main body 82 from the left/right sides. Further, a notch portion (or a penetration hole) 200 is formed at a position corresponding to the screw hole 82a1 of the fixing boss 82a.

Arrangement can be made such that a fastening member 201, such as a bolt, passes through the notch portion (or the penetration hole) of the bracket 2a1 and is screwed into a screw hole 82a1 of the sandwiched fixing boss 82a through a buffer member 202 or the like so that the motor cylinder device 16 is fixed to the bracket 2a1 by the fastening member 201.

The number of fixing boss 82a formed on the cylinder main body 82 is not limited, and more than one fixing boss 82a may be formed per side.

Incidentally, it is preferable that the bracket 2a1 is formed, extending at the lower portion thereof to be disposed under the electric motor 72, and the under-guard 9 is formed there.

Symbol 72b represents an electric cable for supplying electrical signals for the electric motor 72.

The bracket 2a1 formed in such a manner is fixed to, for example, the dashboard 3a (see FIG. 2) of the power plant housing room 2a (see FIG. 2), and the motor cylinder device 16 is thereby disposed in the power plant housing room 2a.

The motor cylinder device 16 disposed in the power plant housing room 2a in such a manner is attached, for example, such that the longitudinal direction of the cylinder main body 82 faces forward and a part or the entire of the cylinder main body 82 is disposed higher than the power plant 2. That is, the motor cylinder device 16 is attached such that at least a part of the cylinder main body 82 overlaps with the power plant 2 with respect to the vehicle upper/lower direction.

As described above, as a space is formed between the power plant 2 and the housing room cover 2b, the cylinder main body 82 is disposed in this space, and it is thereby possible to avoid interference between the cylinder main body 82 and the power plant 2 or the housing room cover 2b.

The space formed above the power plant 2 is often a space with a small capacity due to effects of other auxiliary units or the like, namely a so-called dead space. In contrast, in the present embodiment, regarding the motor cylinder device 16, the cylinder main body 82 side with a relatively small volume is disposed toward this space, and the space can thereby be used as a space where at least a part of the cylinder main body 82 is disposed. Thus, the space in the power plant housing room 2a can be effectively used.

In such a manner, at least a part of the motor cylinder device 16 in the present embodiment is disposed in the space which could easily become a dead space, and the motor cylinder device 16 can be disposed in the power plant housing room 2a with a high space efficiency.

Figure 6:
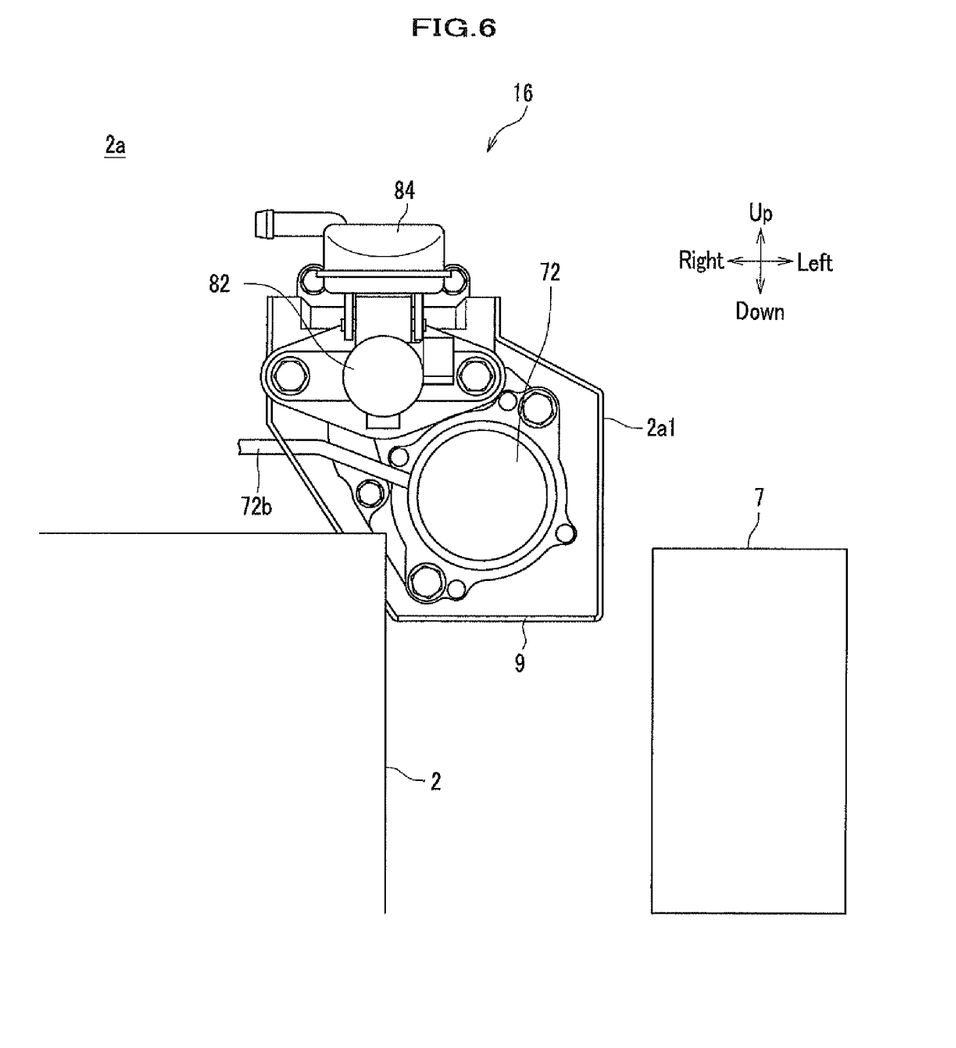
FIG. 6 shows a state that an electric motor is disposed between a power plant and a front side member in a view from above.

Further, the electric motor 72 disposed lower than the cylinder main body 82 may be, as shown in FIG. 6, disposed at a position to which the electric motor 72 is rotated, with the axial line of the cylinder main body 82 as the center of rotation, toward the space side formed between the power plant 2 and a front side member 7, namely, in the direction going away from the power plant 2.

By this arrangement, for example, the downward protrusion amount of the motor cylinder device 16 due to the electric motor 72 can be made small, and even in a case that the space along the vehicle upper/lower direction formed above the power plant 2 between the power plant 2 and the housing room cover 2b (see FIG. 2) is small, the motor cylinder device 16 can be disposed in the space.

Further, as the electric motor 72 is disposed in the space formed between the power plant 2 and the front side member 7, the space formed between the power plant 2 and the front side member 7 can be effectively used.

Also in this point, the motor cylinder device 16 can be disposed in the power plant housing room 2a with a high space efficiency.

Further, in the present embodiment, as the electric motor 72 is disposed lower than the cylinder main body 82, the electric cable 72b for supplying electrical signals to the electric motor 72 is wired below the cylinder main body 82. Accordingly, for example, during a work of attaching the cylinder main body 82 to the power plant housing room 2a from above, events that disturb the work, such as clinging of the electric cable 72b to the cylinder main body 82, do not occur, and the workability is thereby improved.

Further, as the heavy electric motor 72 is disposed lower than the cylinder main body 82, the weight of the motor cylinder device 16 is appropriately distributed so that the motor cylinder device 16 is disposed in the power plant housing room 2a, stably with an excellent weight balance.

Further, as the electric motor 72 is disposed lower than the cylinder main body 82, it is not necessary to ensure a space for disposing the electric motor 72 in the left/right direction of the cylinder main body 82, which improves the space efficiency.

Figure 7A:
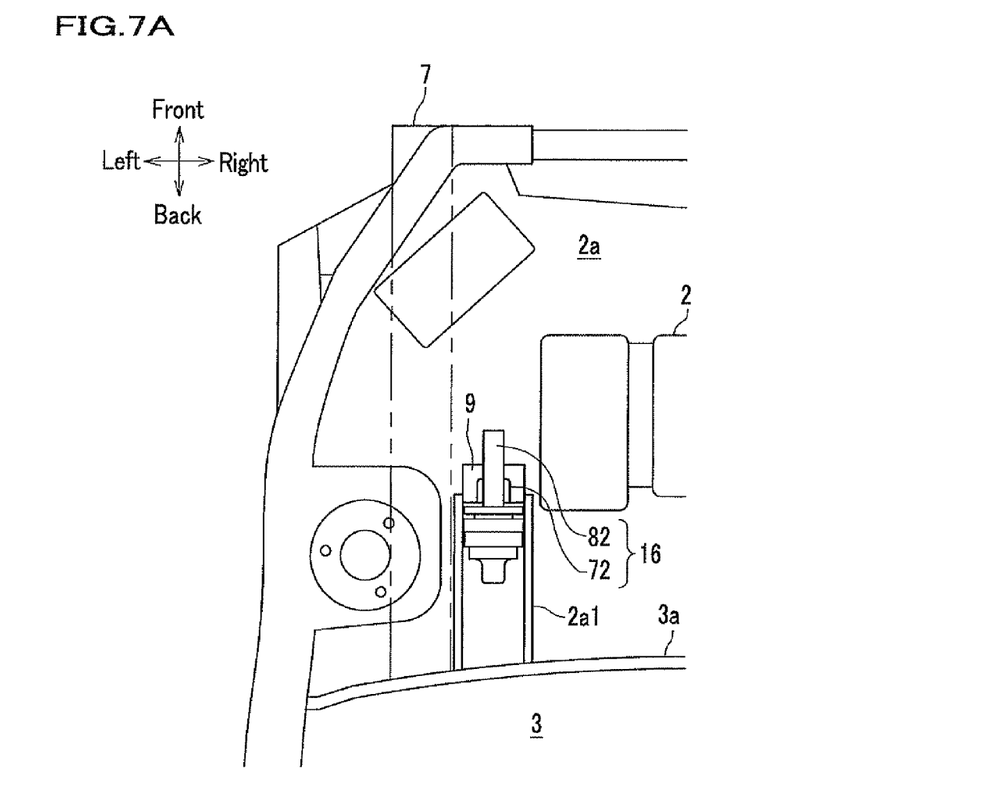
FIG. 7(a) is a plan view of the power plant housing room in which the motor cylinder device is disposed between the power plant and the front side member.

Incidentally, in case that the power plant 2 and even a part of the cylinder main body 82 cannot be disposed, overlapping with each other with respect to the vehicle upper/lower direction, such as a case that the space formed between the power plant 2 and the housing room cover 2b (see FIG. 2) is narrow, the motor cylinder device 16 may be disposed, for example, on the left side (or the right side) of the power plant 2 as shown in FIGS. 7(a) and (b). That is, the motor cylinder device 16 may be disposed in the space formed between the power plant 2 and the front side member 7. Still further, the motor cylinder device 16 may be disposed in the power plant housing room 2a such that the longitudinal direction (axial direction) of the cylinder main body 82 faces forward, and the axial direction of the first slave piston 88a (see FIG. 1) and the second slave piston 88b (see FIG. 1) is along the extending direction of the front side member 7. Also in this case, as shown in FIG. 7(b), the electric motor 72 is preferably disposed lower than the cylinder main body 82.

Figure 7B:
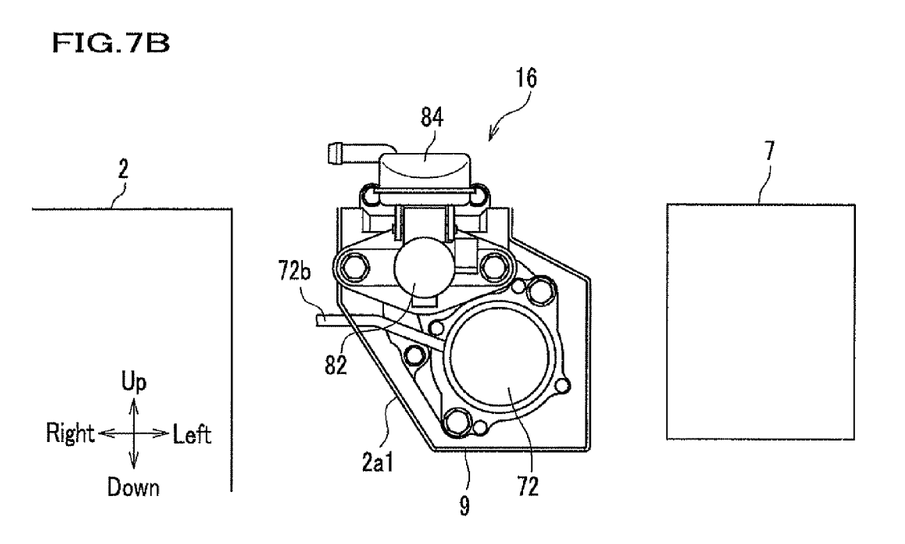
FIG. 7(b) shows a state that the electric motor is disposed at a position rotated in a direction getting away from the power plant in a view from the front.

Yet further, as shown in FIG. 7(b), the electric motor 72 may be disposed at a position rotated, with the axial line of the cylinder main body 82 as the center of rotation, in the direction getting away from the power plant 2, in other words, in the direction toward the outer side of the vehicle 1. As the axial direction of the cylinder main body 82 agrees with the axial direction of the first slave piston 88a (see FIG. 1) and the second slave piston 88b (see FIG. 1), the electric motor 72 is disposed at a position rotated in the direction getting away from the power plant 2, with the axial line of the first slave piston 88a and the second slave piston 88b as the center of rotation.

If the electric motor 72 is disposed in such a manner, a desirable gap is formed between the power plant 2 and the electric motor 72 so that transfer of the heat of the power plant 2 to the electric motor 72 is inhibited, and rising in temperature of the electric motor 72 caused by heat generation by the power plant 2 can be inhibited. Further, when the vehicle 1 (see FIG. 2) runs, as air flowing into the power plant housing room 2a flows in the periphery of the electric motor 72, the electric motor 72 can be effectively cooled.

As described above, when the motor cylinder device 16 (see FIG. 2) is disposed in the power plant housing room 2a (see FIG. 2), in the vehicle brake system 10 (see FIG. 1) in the present embodiment, at least a part of the cylinder main body 82 (see FIG. 2) is disposed in the space formed above the power plant 2 (see FIG. 2) between the power plant 2 and the housing room cover 2b (see FIG. 2). Further, the electric motor 72 (see FIG. 2) is disposed lower than the cylinder main body 82.

By this arrangement, the space formed above the power plant 2 is effectively used, and the motor cylinder device 16 is disposed in the power plant housing room 2a with a high space efficiency. Further, the workability of disposing the cylinder main body 82 in the power plant housing room 2a can be improved.

Still further, as the heavy electric motor 72 is disposed lower than the cylinder main body 82, the motor cylinder device 16 can be disposed in a stable state in the power plant housing room 2a.

Yet further, in case that the power plant 2 and even a part of the cylinder main body 82 cannot be disposed, overlapping with each other with respect to the vehicle upper/lower direction, such as a case that the space formed between the power plant 2 (see FIG. 2) and the housing room cover 2b (see FIG. 2) is narrow, arrangement may be made such that the motor cylinder device 16 is disposed, for example, on the left side (or the right side) of the power plant 2 as shown in FIGS. 7(a) and (b), and the electric motor 72 is disposed lower than the cylinder main body 82. That is, the motor cylinder device 16 may be disposed in the space formed between the power plant 2 and the front side member 7. Further, the motor cylinder device 16 may be disposed in the power plant housing room 2a such that the longitudinal direction (axial direction) of the cylinder main body 82 faces forward, and the axial direction of the first slave piston 88a (see FIG. 1) and the second slave piston 88b (see FIG. 1) is along the extending direction of the front side member 7. Also in this case, as shown in FIG. 7(b), the electric motor 72 is preferably disposed lower than the cylinder main body 82.

Still further, as shown in FIG. 7(b), the electric motor 72 may be disposed at a position rotated, with the axial line of the cylinder main body 82 as the center of rotation, in the direction getting away from the power plant 2, in other words, in the direction toward the outer side of the vehicle 1. As the axial direction of the cylinder main body 82 agrees with the axial direction of the first slave piston 88a (see FIG. 1) and the second slave piston 88b (see FIG. 1), the electric motor 72 is disposed at a position rotated in the direction getting away from the power plant 2, with the axial line of the first slave piston 88a and the second slave piston 88b as the center of rotation.

By this arrangement, the motor cylinder device 16 can be disposed in the space between the power plant 2 and the front side member 7, and the space in the power plant housing room 2a can be effectively used. Further, the electric motor 72 can be inhibited from rising in temperature due to heat generation by the power plant 2, and the electric motor 72 can be further effectively cooled.

DESCRIPTION OF REFERENCE SYMBOLS

1 . . . vehicle
2 . . . power plant (vehicle power unit)
2a . . . power plant housing room (housing room)
2a1 . . . bracket
7 . . . front side member
9 . . . under-guard (guard member)
10 . . . vehicle brake system
12 . . . brake pedal (brake operation section)
14 . . . input device
16 . . . motor cylinder device (electric brake actuator)
72 . . . electric motor
72a . . . motor casing
82 . . . cylinder main body
88a . . . first slave piston (hydraulic pressure control piston)
88b . . . second slave piston (hydraulic control piston)

The invention claimed is:

1. A vehicle comprising a vehicle body, a vehicle power unit disposed between front side members that extend along a front and rear direction on a left side and a right side of the vehicle body, and a brake-by-wire brake system, the brake system comprising:
an input device to which braking operation by an operator is input, the input device comprising a master cylinder;
an electric brake actuator separate from said master cylinder and comprising an electric motor and a cylinder main body containing a hydraulic pressure control piston, said electric brake actuator provided for generating a hydraulic brake pressure by driving the hydraulic pressure control piston by the electric motor, an amount of said hydraulic brake pressure determined according to at least the braking operation, and
a guard member for protecting the electric motor from an object bounced up by running of the vehicle, said guard member being formed integrally with a bracket provided for attaching the electric brake actuator to the vehicle,
wherein the input device and the electric brake actuator are mounted on the vehicle body,
wherein the electric motor is disposed in a first space formed between the vehicle power unit and one of the front side members, and is rotated, with the axial line of the cylinder main body as the center of rotation, toward the first space in a direction going away from the vehicle power unit,
and wherein the cylinder main body is disposed in a second space formed above the vehicle power unit.

2. The vehicle according to claim 1, wherein the electric motor of the electric brake actuator is disposed, such that an axial direction of the hydraulic pressure control piston and an output shaft of the electric motor are substantially parallel to each other.

3. The vehicle of claim 1, wherein the bracket comprises a base plate for placement below the electric actuator, a first side plate integrally formed with the base plate and extending upwardly therefrom on a first side of the electric brake actuator, and a second side plate integrally formed with the base plate and extending upwardly therefrom on a second side of the electric brake actuator.

4. A vehicle comprising a vehicle body, a vehicle power unit disposed between front side members that extend along a front and rear direction on a left side and a right side of the vehicle body, and a brake-by-wire brake system, the brake system comprising:
an input device to which braking operation by an operator is input the input device comprising a master cylinder; and
an electric brake actuator separate from said master cylinder and comprising an electric motor and a cylinder main body containing a hydraulic pressure control piston, said electric brake actuator provided for generating a hydraulic brake pressure by driving the hydraulic pressure control piston by the electric motor, an amount of said hydraulic brake pressure determined according to at least the braking operation, wherein the input device and the electric brake actuator are mounted on the vehicle body, wherein the electric motor is disposed lower than the cylinder main body, wherein the electric motor is disposed in a first space formed between the vehicle power unit and one of the front side members, and is rotated, with the axial line of the cylinder main body as the center of rotation, toward the first space in a direction going away from the vehicle power unit, wherein the cylinder main body is disposed in a second space formed above the vehicle power unit, and wherein said brake system further comprises a guard member for protecting the electric motor from an object bounced up by running of the vehicle, said guard member being formed integrally with a bracket for attaching the electric brake actuator to the vehicle.

5. The vehicle of claim 4, wherein the bracket comprises a base plate for placement below the electric brake actuator, a first side plate integrally formed with the base plate and extending upwardly therefrom on a first side of the electric brake actuator, and a second side plate integrally formed with the base plate and extending upwardly therefrom on a second side of the electric brake actuator.

6. A vehicle comprising a vehicle body, a vehicle power unit disposed between front side members that extend along a front and rear direction on a left side and a right side of the vehicle body, and a brake-by-wire brake system, the brake system comprising:

an input device to which braking operation by an operator is input, the input device comprising a master cylinder;

a stroke simulator which is selectively hydraulically connectable to the master cylinder; and an electric brake actuator which is separate and spaced apart from said master cylinder, and which comprises an electric motor and a cylinder main body containing a hydraulic pressure control piston, said electric brake actuator provided for generating a hydraulic brake pressure by driving the hydraulic pressure control piston by the electric motor, an amount of said hydraulic brake pressure determined according to at least the braking operation, and a guard member for protecting the electric motor from an object bounced up by running of the vehicle, said guard member being formed integrally with a bracket provided for attaching the electric brake actuator to the vehicle, wherein the input device and the electric brake actuator are mounted on the vehicle body, wherein the electric motor is disposed in a first space formed between the vehicle power unit and one of the front side members, and is rotated, with the axial line of the cylinder main body as the center of rotation, toward the first space in a direction going away from the vehicle power unit, and wherein the cylinder main body is disposed in a second space formed above the vehicle power unit.

7. The vehicle of claim 6, wherein the bracket comprises a base plate for placement below the electric actuator, a first side plate integrally formed with the base plate and extending upwardly therefrom on a first side of the electric brake actuator, and a second side plate integrally formed with the base plate and extending upwardly therefrom on a second side of the electric brake actuator.

* * * * *